Nov. 17, 1964   R. H. PRICE   3,157,383
DIAPHRAGM VALVE

Filed June 10, 1963   3 Sheets-Sheet 1

Inventor
Richard H. Price

Nov. 17, 1964  R. H. PRICE  3,157,383
DIAPHRAGM VALVE

Filed June 10, 1963  3 Sheets-Sheet 2

Inventor
Richard H. Price

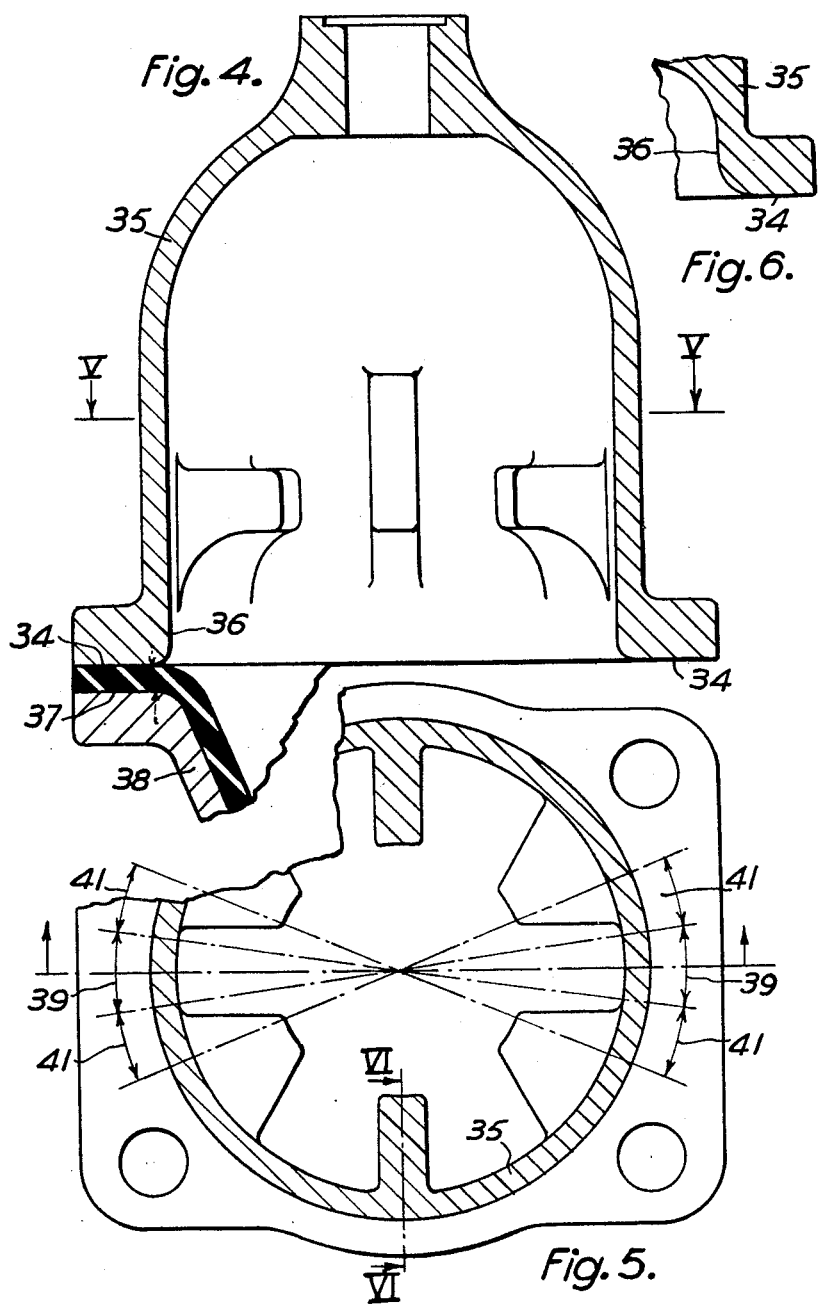

3,157,383
DIAPHRAGM VALVE
Richard Hector Price, Cwmbran, England, assignor to Saunders Valve Company Limited, Cwmbran, England, a British company
Filed June 10, 1963, Ser. No. 286,751
Claims priority, application Great Britain, June 12, 1962, 22,608/62
10 Claims. (Cl. 251—331)

This invention relates to diaphragm valves for controlling fluids of the kind comprising a diaphragm shaped when free to correspond with the closed position of the valve, clamped at its margin between a bonnet a flat diaphragm-clamping surface of which makes a rounded junction with the internal wall thereof, and a valve casing having a substantially straight bore of substantially constant cross-sectioned area and a seating formed in part by the surface of a lateral opening which from a rounded sweep of large radius joining it to a flat diaphragm-clamping surface on the valve casing extends inwardly at a substantial taper, the tapering sides of the opening running smoothly into the cross-section of the bore which thereby completes the seating, the diaphragm in the closed position of the valve being pressed by an actuator to which it is attached against the seating inward of the rounded sweep and being slightly stretched in the region of the rounded sweep and when the valve is opened being retracted by the actuator and forming an outward corrugation into the bonnet within the clamped margin. Valves of this kind are described for example in United States specification No. 2,705,124, Re. No. 24,350, but the invention is equally applicable to valves of the same general kind in which the body has been modified by lowering the height at which the clamping surface for the diaphragm is provided and providing a slight rise in the bottom of the valve bore towards the diaphragm from each end, the cross sectional area of the bore being maintained substantially constant by widening it from the ends towards the diaphragm. Such modifications enable the valve to be fitted with a smaller diameter of diaphragm while preserving a substantially constant flow cross section without abrupt changes and with the possibility of rodding through.

In such valves the annular zone of the diaphragm just inward of the clamped margin undergoes considerable changes in form between closed and open position and it is this which makes it necessary to give the seating and the diaphragm the rounded sweep of large radius between the tapering part and the clamped margin. It is equally necessary to round off the junction of the flat clamping surface on the bonnet with the internal wall of the bonnet, to avoid damage to the diaphragm when it is outwardly corrugated. Better to provide for the outward corrugation of the diaphragm when the valve is open, the margin of the diaphragm is not made flat but is sloped, though less steeply, in the same direction as the side of the tapering part, see the United States specification No. 2,840,339. The tolerances which have to be allowed in practical manufacture make it possible to provide the actuator with an outward turnover to match the rounded sweep in the casing and it is for this reason that when the valve is closed the actuator only presses on the diaphragm inward of the sweep while over the sweep the slight stretching of the diaphragm material is relied on to provide a seal in this region. This seal is required at the sides, as viewed along the valve bore.

It has been found especially in valves of large bore say 8 inches (20 cm.) or above, that a valve of the kind in question which may be tight at an appropriate test pressure when first assembled tends to leak after it has been opened and closed two or three times. It is believed that this is because the mere clamping of the sloping margin of the diaphragm induces or tends to induce slight ruckling on the underside in the zone just inward of the clamped margin and that though this may easily be drawn tight by the stretching action the first time the valve is closed, the wedging action of the actuator tends to increase the ruckling just inward of the clamped margin while the friction of the diaphragm against the rounded sweep in the casing results in the stretching force falling off in value going from the conical part towards the clamped margin so that it is insufficient to pull out the increased ruckling just inward of the clamped margin.

According to the present invention the actual clamping surface on the bonnet over most of the periphery lies outside the line at which the clamping surface on the casing joins the rounded sweep but over a narrow zone on each side extends inwards so that in these zones a greater radial width of the diaphragm is firmly clamped, without the inward extension being great enough to interfere with the correct formation of the outward corrugation when the valve is opened.

It is believed that as the result of the greater width of margin which is clamped over the two zones, stretching is confined to the part which lies over the rounded sweep between the clamping face on the casing and the rest of the lateral opening. Whether or not this theory is correct it is found in practice that a valve so modified remains tight on repeated opening and closing at an appropriate test pressure. The slight asymmetry round the axis of the diaphragm does not occasion any interference with the correct formation of the upward corrugation when the valve is open, indeed it facilitates it in that there is less hindrance than if the clamping surface on the bonnet were brought inwards all round.

The application of the invention is not confined to valves of large bore though the problem with which it deals is greater in such valves than in those of smaller bore. Its application to valves of smaller bore enables them to operate satisfactorily with higher line pressures than valves of the existing form.

A simple way of forming the inward extensions is to leave the cross section of the internal wall of the bonnet unchanged all round and to decrease the radius of the rounded junction of the clamping surface on the bonnet with the internal wall thereof in the two zones. To avoid any abrupt changes in the surface of the rounded junction, transitional zones in which the radius gradually increases are provided at the ends of the two side zones. These transitional zones could occupy the whole of the rest of the periphery but usually they will be quite short, the rest of the periphery having a rounded junction with a constant radius greater than that in the two side zones.

Another way of forming the inward extensions is to leave the cross sectional form of the internal wall of the bonnet round most of the periphery unchanged, but to bring the wall inward in the two side zones, suitably by making them chords of the general cross sectional form, which may moreover be located so that in the mid-transverse plane the rounded junction in the bonnet lies slightly inward of the junction of the rounded sweep with the clamping surface on the casing. As before abrupt transitions in any part of the rounded junction should be avoided.

The reduction of radius can be used in conjunction with the bringing inward of the internal wall of the bonnet at the two side zones.

The invention will be further described with reference to the accompanying drawings in which—

FIG. 4 is an axial section of the bonnet of another valve according to the invention, on the mid-transverse plane;

FIG. 5 is a section on the line V—V of FIG. 4; and

FIG. 6 is a detail section on the line VI—VI of FIG. 5.

Figure 1:
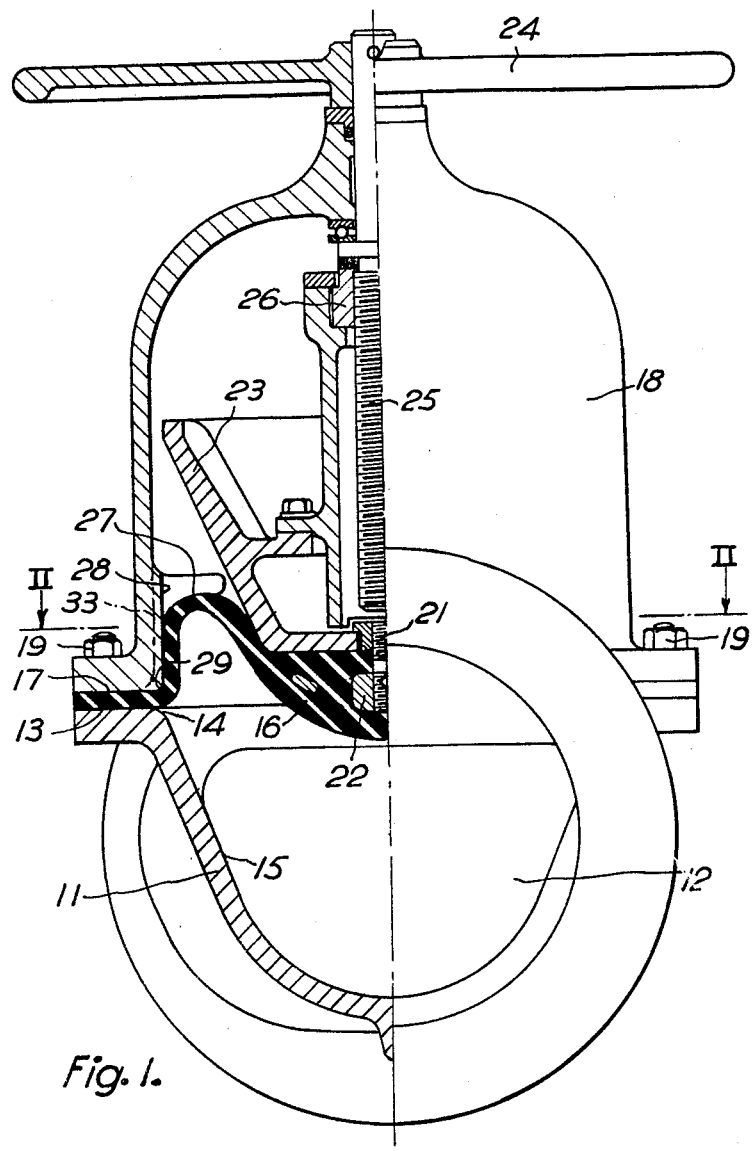
FIG. 1 is an axial section of a valve according to the invention, on the mid-transverse plane.
Figure 2:
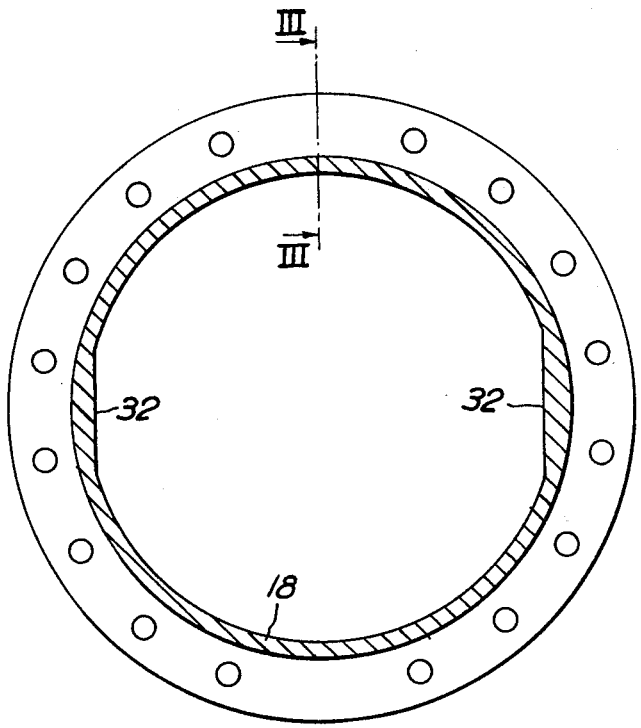
FIG. 2 is a section on the line II—II of FIG. 1.
Figure 3:
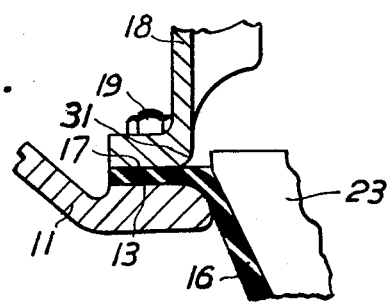
FIG. 3 is a detail section on the line III—III of FIG. 2.

The valve illustrated in FIGS. 1 to 3 includes a casing 11 with a straight bore 12 and a lateral opening symmetrical around an axis perpendicular to the bore, which from a flat clamping face 13 on the casing transverse to the said axis, joins by a rounded sweep 14 a tapering wall 15 which as seen in FIG. 1 runs tangentially into the wall of the bore 12. A flexible diaphragm 16 has its margin clamped between the face 13 and a flat transverse clamping face 17 on a bonnet 18 bolted to the casing 11 by bolts such as 19 traversing holes in the diaphragm. The diaphragm carries a stud 21 with its head 22 embedded in the centre of the diaphragm, the stud serving to secure it to an actuator 23 which can be moved axially to open and close the valve by suitable means exemplified by a handwheel 24, screwed spindle 25 and nut 26.

The diaphragm apart from the clamped margin is moulded in a shape corresponding to the closed position of the valve in which it lies closely against the sweep 14, tapering wall 15 and the part of the bore extending from one side of the wall to the other. In this position it is pressed against the tapering wall 15 and the said part of the bore by the actuator 23 which is shaped to correspond but the actuator does not match the sweep 14 and there is no direct pressure here. The parts are proportioned so that in the closed position the part of the diaphragm extending over the sweep is slightly stretched, the pressure of the diaphragm against the sweep engendered by the tension being relied on to make a tight seal in these regions. For the valve to close tightly it is enough that this tension—engendered seal should be made on each side over a narrow zone extending perpendicular to the plane of FIG. 1.

When the valve is opened by retracting the actuator, the stud pulls the diaphragm off its seating and when the valve is fully opened it corrugates upwardly as at 27 FIG. 1 the corrugation lying just within the clamped margin. To avoid damage the junction between the clamping face 17 and the internal wall 28 of the bonnet 18 is rounded as at 29 FIG. 1 and 31 FIG. 3. Also better to accommodate the upward corrugation, over most of the periphery of the clamping faces, the inner boundary of the clamping face 17 i.e. the point at which the rounded junction 29 runs out of the actual clamping face 17, lies outside the inner boundary of the flat face 13 on the casing i.e. outside the point at which the sweep 14 runs out of the face 13. Thus there is a narrow inner annulus of the face 13 which is flat but against which the margin of the diaphragm is not clamped and in the prior art valves this annulus was complete.

Better to ensure the formation of the upward corrugation and reduce the load on the stud involved in inverting the diaphragm to open the valve, when the diaphragm is free its margin is not flat like the clamping faces 13, 17 but is curved in the same direction but less steeply than the tapering wall 15.

As a result it is believed that a slight ruckle tends to form on the underside of the diaphragm, just inside the limit of the margin which is firmly clamped between the faces 13, 17 i.e. in the part resting on the annulus above mentioned. When the valve is first closed it is found to be tight, whereas after the valve has been opened and closed a few times, in the prior art valve leakage tends to occur in this region and it is believed that this is due to the ruckle being pulled out on the first closure but being reformed when the valve is opened and gradually taking a more permanent character.

It will be seen from FIG. 2 that in applying the present invention, in two opposite side zones the internal wall of the bonnet is carried inward, suitably taking the form of a chord 32. Correspondingly the actual flat clamping face 17 on the bonnet is extended further inwards and in this particular example, a slight further extension of the flat surface is obtained by making the radius of the rounded junction in this zone, 29 FIG. 1, less than the radius of the rounded junction in the rest of the annulus, 31 in FIG. 1. These two differences can be seen by comparison of FIGS. 1 and 3 and also from the chain line 33 in FIG. 1, which indicates the same section as that shown in FIG. 3.

The effect of making the internal wall of the bonnet of chord form is to make the increased radial width of the actual clamping face 17 on the bonnet gradually decrease from the plane of FIG. 1 to the ends of the chord. A chord, i.e. straight line, form is not essential. Any other convenient form which provides a suitable width of zone to give the increased clamping area may be used provided there are no sudden changes likely to hinder proper formation of the corrugation in the diaphragm or other disturbance. Also it is not always essential that the radius of the junction 29 should be less in the zones than elsewhere.

The inward extension of the actual clamped margin is believed to ensure that the ruckle is formed further inward in a position in which the stretching action over the sweep 14 is more effective in pulling it out when the valve is closed. Whether or not this theory is correct, in practice a substantial improvement as regards leakage in these regions is obtained, all other things remaining unchanged.

In the illustrated example the two chords 32 subtend an angle of about 36° at the axis and this provides a suitable inward extension of the clamping surface on the bonnet but reasonable variations are possible on the one hand without loss of tightness and on the other without undue disturbance in the formation of the corrugation.

In the example shown in FIGS. 4, 5 and 6 the inward extension of the actual clamping surface on the bonnet is obtained solely by decreasing the radius of the rounded junction between the clamping face 34 on the bonnet 35 and the internal wall 36 of the bonnet. From FIG. 4 it will be seen that the internal wall 36 towards the lower end of the bonnet is cylindrical. Round most of the periphery the radial width of the clamping face 34 is less than that of the flat clamping face 37 on the casing 38 so that the outer boundary of the face 34 lies outside the outer boundary of the face 37 but over a zone 39 each side of angular width about 16° the radius is less so that the actual clamping face 34 is substantially equal to the width of the flat face 37 as may be seen in FIG. 4. Over another zone 41 the radius of the junction between the face 34 and the wall 36 gradually changes from the value it has in the zone 39 to the value shown in FIG. 6 which it has all round between the ends of the zones 41. Zones 41 may have an angular width of 14° but the angular widths of the zones 39 and 41 may vary considerably from these figures. The radius of the junction in the zones 39 may be half that in the parts between the zones 41 but this is not a limiting relationship. In the case of a valve having a nominal bore of 3 inches (75 mm.) the radius of the junction in the zones 39 may be 3/16 inch i.e. D/16 where D is the nominal bore.

The construction shown in FIGS. 1 to 3 is better suited to valves of large bore say 8 inches (200 mm.) upwards and that of FIGS. 4, 5 and 6 to valves of smaller bore.

I claim:

1. A diaphragm valve of the kind comprising a diaphragm clamped at its margin between a bonnet, a flat diaphragm clamping surface of which makes a rounded junction with the internal wall thereof, and a valve casing having a substantially straight bore of substantially constant cross-sectional area and a seating formed in part by the surface of a lateral opening which from a rounded sweep of large radius joining it to a flat diaphragm clamping surface on the valve casing extends inwardly at a substantial taper, the tapering sides of the opening running smoothly into the cross-section of the bore which thereby completes the seating, the diaphragm when free corresponding to the closed position of the valve except at its margin which slopes in the same direction but less steeply than the tapering part, the diaphragm in the closed position of the valve being pressed by an actuator to which it is attached, against the seating inward of the rounded sweep and being slightly stretched in the region of the rounded sweep, and when the valve is opened being retracted by the actuator and forming an outward corrugation into the bonnet within the clamped margin, characterised in this, that the actual clamping surface on the bonnet over most of the periphery lies outside the line at which the clamping surface on the casing joins the rounded sweep but over a narrow zone on each side extends inwards so that in these zones a greater radial width of the diaphragm is firmly clamped, without the inward extension being great enough to interfere with the correct formation of the outward corrugation when the valve is opened.

2. A valve according to claim 1 in which the inward extensions are formed by a decrease in the radius of the rounded junction of the clamping surface on the bonnet with the internal wall thereof in the two zones, transitional zones in which the radius gradually increases being provided at the ends of the two zones aforesaid.

3. A valve according to claim 2 in which the side zones each subtend an angle at the axis of the clamping surface of about 16° and the radius of the rounded junction within the two side zones is about half that in the parts of the periphery beyond the transition zones.

4. A valve according to claim 1 in which the inwardly extending zones of the clamping surface on the bonnet are formed by bringing the internal wall of the bonnet inward in these two zones without forming abrupt transitions in any part of the rounded junction.

5. A valve according to claim 4 in which the internal wall of the inwardly extending side zones of the bonnet is formed by chords of the general cross-sectional form of the internal wall, parallel to the axis of the bore.

6. A valve according to claim 5 in which in the mid-transverse plane of the valve the rounded junction in the bonnet lies slightly inward of the junction of the rounded sweep with the clamping surface on the casing.

7. A valve according to claim 6 in which each chord subtends an angle at the axis of the clamping surface of about 36°.

8. A valve according to claim 4 in which the radius of the rounded junction in the bonnet is less in the zones than elsewhere.

9. A diaphragm valve comprising a valve casing having a substantially straight bore of substantially constant cross-sectional area, a flat circular annular first diaphragm-clamping surface on the casing surrounding a lateral opening in the casing, a seating in the casing formed in part by the surface of the lateral opening which from the inner boundary of the first diaphragm-clamping surface runs with a rounded sweep of large radius and continues inwardly at a substantial taper, the tapering sides of the opening running smoothly into the cross-section of the bore which thereby completes the seating, a bonnet secured to the casing, the bonnet having an internal cylindrical wall perpendicular to the first diaphragm-clamping surface, a flat circular annular second diaphragm-clamping surface on the bonnet facing and generally opposite the first diaphragm-clamping surface, a rounded junction between the second diaphragm-clamping surface and the internal wall of the bonnet, the radius of the rounded junction having a value of about one sixteenth of the nominal bore of the valve over two diametrically opposite side zones each subtending an angle of about 16° at the axis of the second diaphragm-clamping surface and from these two zones increasing gradually over zones of an angular width of about 14° to a value of about one eighth of the nominal bore of the valve and remaining at that value round the rest of the periphery, a diaphragm clamped by its margin between the first and second diaphragm-clamping surfaces, the diaphragm when free corresponding on its front surface to the shape of the seating but having a margin which slopes in the same direction but less steeply than the tapering part, an actuator attached to the centre of the back of the diaphragm, and means for moving the actuator between positions in which the valve is closed and opened, the actuator being shaped to match the diaphragm within the rounded sweep in the closed position whereby it presses the diaphragm against the seating inward of the rounded sweep and slightly stretches it in the region of the rounded sweep while in the open position it retracts the diaphragm which forms an outward corrugation into the bonnet within the clamped margin.

10. A diaphragm valve comprising a valve casing having a substantially straight bore of substantially constant cross-sectional area, a flat circular annular first diaphragm-clamping surface on the casing surrounding a lateral opening in the casing, a seating in the casing formed in part by the surface of the lateral opening which from the inner boundary of the first diaphragm-clamping surface runs with a rounded sweep of large radius and continues inwardly at a substantial taper, the tapering sides of the opening running smoothly into the cross-section of the bore which thereby completes the seating, a bonnet secured to the casing, the bonnet having an internal wall perpendicular to the first diaphragm-clamping surface, said wall being cylindrical except at two opposite side zones with a diameter approximately equal to the inner boundary of said first diaphragm-clamping surface, the wall at said two zones being a chord of the cylindrical surface subtending about 36° at the axis of the bonnet, a flat annular second diaphragm-clamping surface on the bonnet facing and generally opposite the first diaphragm-clamping surface, a rounded junction between the second diaphragm-clamping surface and the internal wall of the bonnet the radius of which is less in said two side zones than elsewhere, a diaphragm clamped by its margin between the first and second diaphragm-clamping surfaces, the diaphragm when free corresponding on its front surface to the shape of the seating but having a margin which slopes in the same direction but less steeply than the tapering part, an actuator attached to the centre of the back of the diaphragm, and means for moving the actuator between positions in which the valve is closed and opened, the actuator being shaped to match the diaphragm within the rounded sweep in the closed position whereby it presses the diaphragm against the seating inward of the rounded sweep and slightly stretches it in the region of the rounded sweep while in the open position it retracts the diaphragm which forms an outward corrugation into the bonnet within the clamped margin.

References Cited by the Examiner
UNITED STATES PATENTS

| 2,705,124 | 3/55 | Price | 251—331 XR |
| 2,963,266 | 12/60 | Boteler | 251—331 |

ISADOR WEIL, *Primary Examiner.*

WILLIAM F. O'DEA, *Examiner.*